(12) United States Patent
Ertmer

(10) Patent No.: US 7,977,604 B2
(45) Date of Patent: Jul. 12, 2011

(54) WIRE DRIVE ROLL

(75) Inventor: Jonathan R. Ertmer, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1371 days.

(21) Appl. No.: 11/502,804

(22) Filed: Aug. 10, 2006

(65) Prior Publication Data
US 2008/0035625 A1   Feb. 14, 2008

(51) Int. Cl.
- *B23K 9/28* (2006.01)
- *B23K 9/12* (2006.01)
- *B23K 9/32* (2006.01)
- *B65H 20/00* (2006.01)

(52) U.S. Cl. ............ 219/137.2; 219/137.7; 219/137.63; 226/181; 226/182; 226/185; 226/190

(58) Field of Classification Search ............... 219/137.7, 219/130.1, 137.2, 137.63; 226/182, 177, 226/181, 185, 190
See application file for complete search history.

(56) References Cited

U.S. PATENT DOCUMENTS

| | | | | |
|---|---|---|---|---|
| 5,816,466 | A * | 10/1998 | Seufer | 226/187 |
| 6,374,655 | B1 * | 4/2002 | Hresc | 72/129 |
| 6,536,644 | B2 * | 3/2003 | Plow | 226/190 |
| 6,557,742 | B1 * | 5/2003 | Bobeczko et al. | 226/186 |
| 6,568,578 | B1 * | 5/2003 | Kensrue | 226/176 |
| 6,903,305 | B2 * | 6/2005 | Mukai et al. | 219/137.7 |
| 7,374,074 | B2 * | 5/2008 | Matiash | 226/182 |
| 7,615,723 | B2 * | 11/2009 | Matiash | 219/137.2 |

FOREIGN PATENT DOCUMENTS

| | | |
|---|---|---|
| DE | 44 20 706 | 12/1995 |
| EP | 1 584 401 | 10/2005 |

\* cited by examiner

*Primary Examiner* — Stephen J Ralis
*Assistant Examiner* — Ayub Maye
(74) *Attorney, Agent, or Firm* — Fletcher Yoder P.C.

(57) ABSTRACT

A drive roll for advancing a wire is provided. In certain embodiments, the drive roll includes a body having a wire feed portion, a mounting portion, and a central aperture through the body. In one embodiment, the feed portion includes an outer circumferential surface of the drive roll and a plurality of grooves for receiving and advancing various wires, while the mounting portion includes mounting features that are each uniquely associated with only one of the grooves. Various wire feed systems and welding systems are also provided.

19 Claims, 5 Drawing Sheets

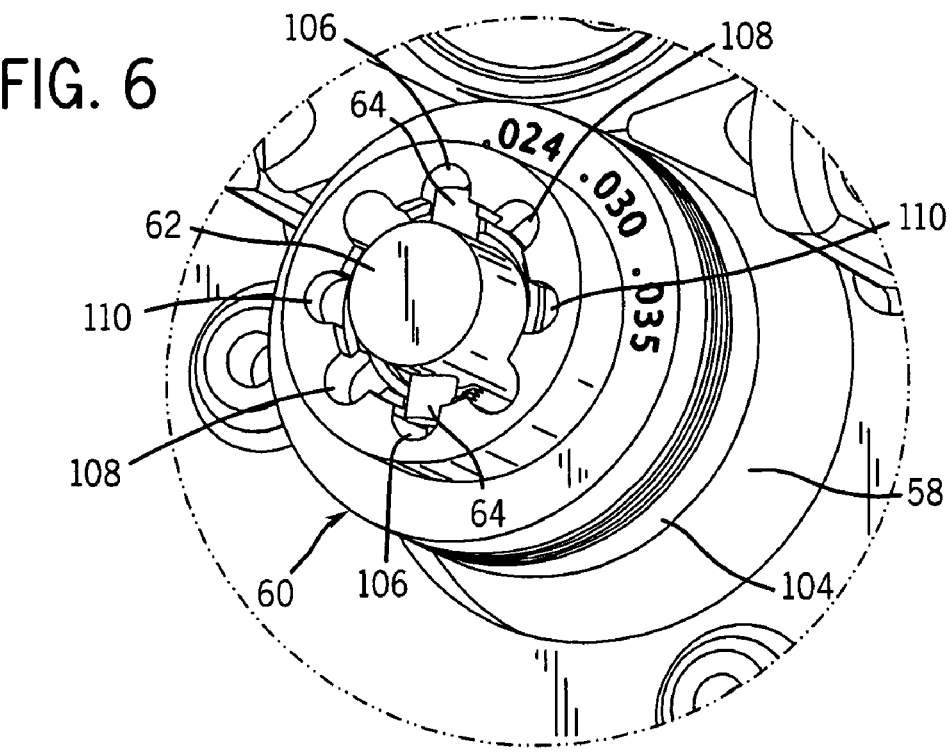
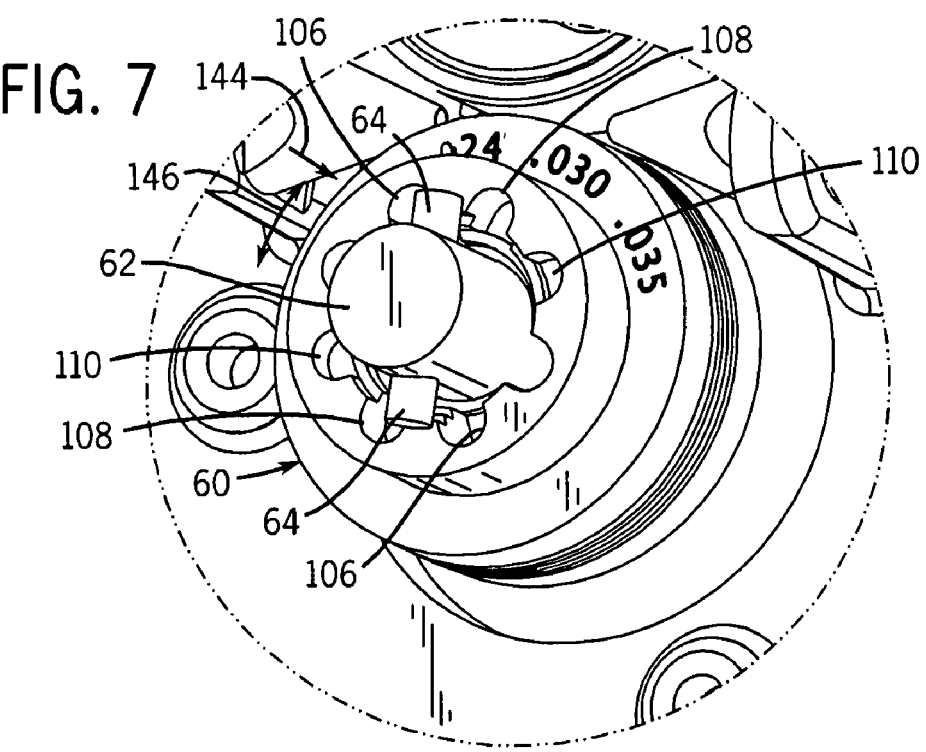

WIRE DRIVE ROLL

BACKGROUND

The invention relates generally to welding systems and, more particularly, to wire feed assemblies of such systems.

A common metal welding technique employs the heat generated by electrical arcing to transition a portion of a workpiece to a molten state, and the addition of filler metal from a wire or electrode. One technique that employs this arcing principle is wire-feed welding. At its essence, wire-feed welding involves routing welding current from a power source into an electrode that is brought into close proximity or contact with the workpiece. When the electrode is sufficiently close to or touching the workpiece, current arcs from the electrode to the workpiece, completing a circuit and generating sufficient heat to melt and weld the workpiece. Often, the electrode is consumed and becomes part of the weld itself. Thus, new wire electrode is advanced, continuously replacing the consumed electrode and maintaining the welding arc. If the welding device is properly adjusted, the wire-feed advancement and arcing cycle progresses smoothly, providing a good weld. One common type of wire-feed welding is metal inert gas or "MIG" welding.

In typical wire-feed systems, wire electrode is advanced by a wire feeder and directed through a welding cable, into a torch assembly, and into a contact tip housed within the torch assembly. Electrical current is routed from the welding cable to the wire electrode through the contact tip. When a trigger on the welding torch is operated, wire electrode is advanced toward the contact tip, at which point current is conducted from the contact tip into the advancing electrode.

As will be appreciated, it may be desirable to change the type of wire electrode used by a welding system based on the particular workpiece. For instance, welding operations performed on two different workpieces may benefit from using wire electrodes of different sizes or compositions. However, wire feeders within such systems typically include drive rolls disposed at fixed positions with respect to a path in which a wire electrode is advanced. These typical drive rolls may have a single groove configured to receive a particular type of wire or a pair of grooves on opposite ends of the drive roll for receiving two types of wire. In the case of the former, an operator is generally required to remove the drive roll from the system and replace it with a different drive roll in order to configure the system for use with a different wire type. In the latter instance, the two-groove drive roll must be removed from the system, reversed, and reinstalled to align the desired groove with the wire path. Consequently, these common drive rolls are generally configured to advance only one or two types of wire electrodes, and typically require disassembly of a portion of the welding system in order to change between various wire types.

Therefore, there exists a need for an improved drive assembly for welding devices that facilitates quicker and easier configuration of the welding system for use with different wire electrodes.

BRIEF DESCRIPTION

As discussed in detail below, certain embodiments of the present invention may provide an improved drive roll for a wire feed system. In one embodiment, the drive roll includes a plurality of circumferential grooves that are collectively configured to receive and advance wires of various sizes and/or compositions. Each groove is associated with a respective mounting recess or recesses, and the drive roll is configured such that a particular groove is aligned with a wire path of the wire feed system when an alignment member, such as a tab on a shaft to which the drive roll is mounted, is disposed within the mounting recess corresponding to the particular groove. Various other configurations, in addition to systems including one or more such drive rolls, are also envisaged.

DRAWINGS

These and other features, aspects, and advantages of the present invention will become better understood when the following detailed description is read with reference to the accompanying drawings in which like characters represent like parts throughout the drawings, wherein.

Figure 3:
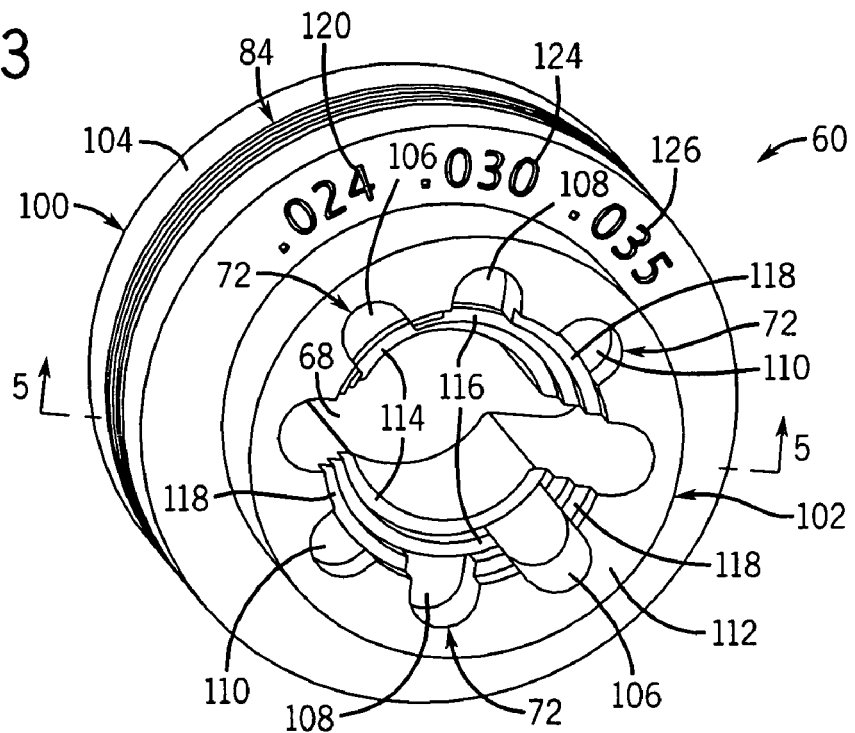
FIG. 3 is front perspective view of a drive roll of the drive system of FIG. 2, the exemplary drive roll having a plurality of circumferential grooves in accordance with one embodiment of the present invention.
Figure 4:
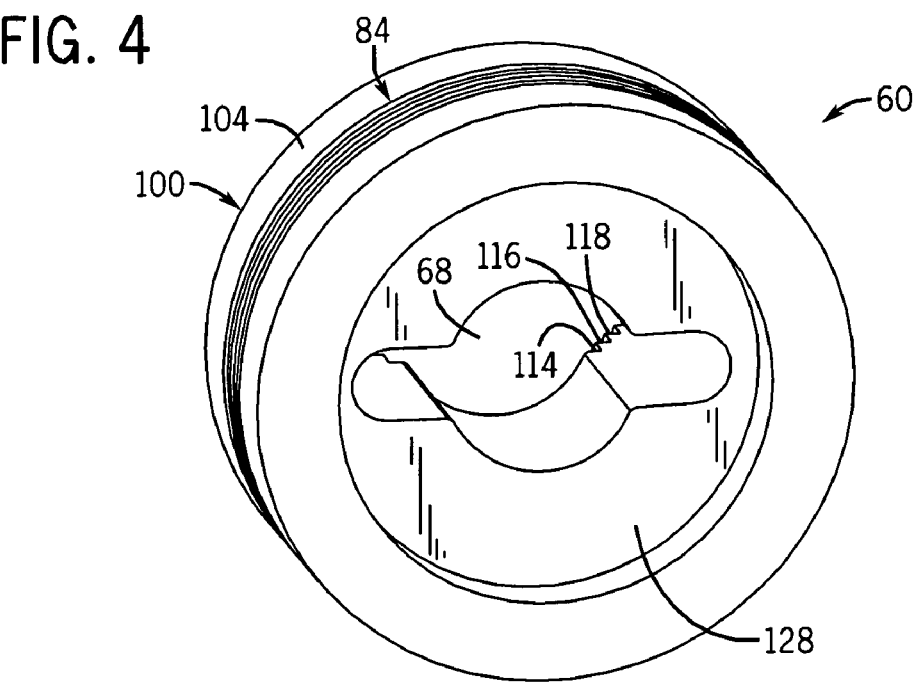
FIG. 4 is a rear perspective view of the drive roll of FIG. 3.
Figure 5:
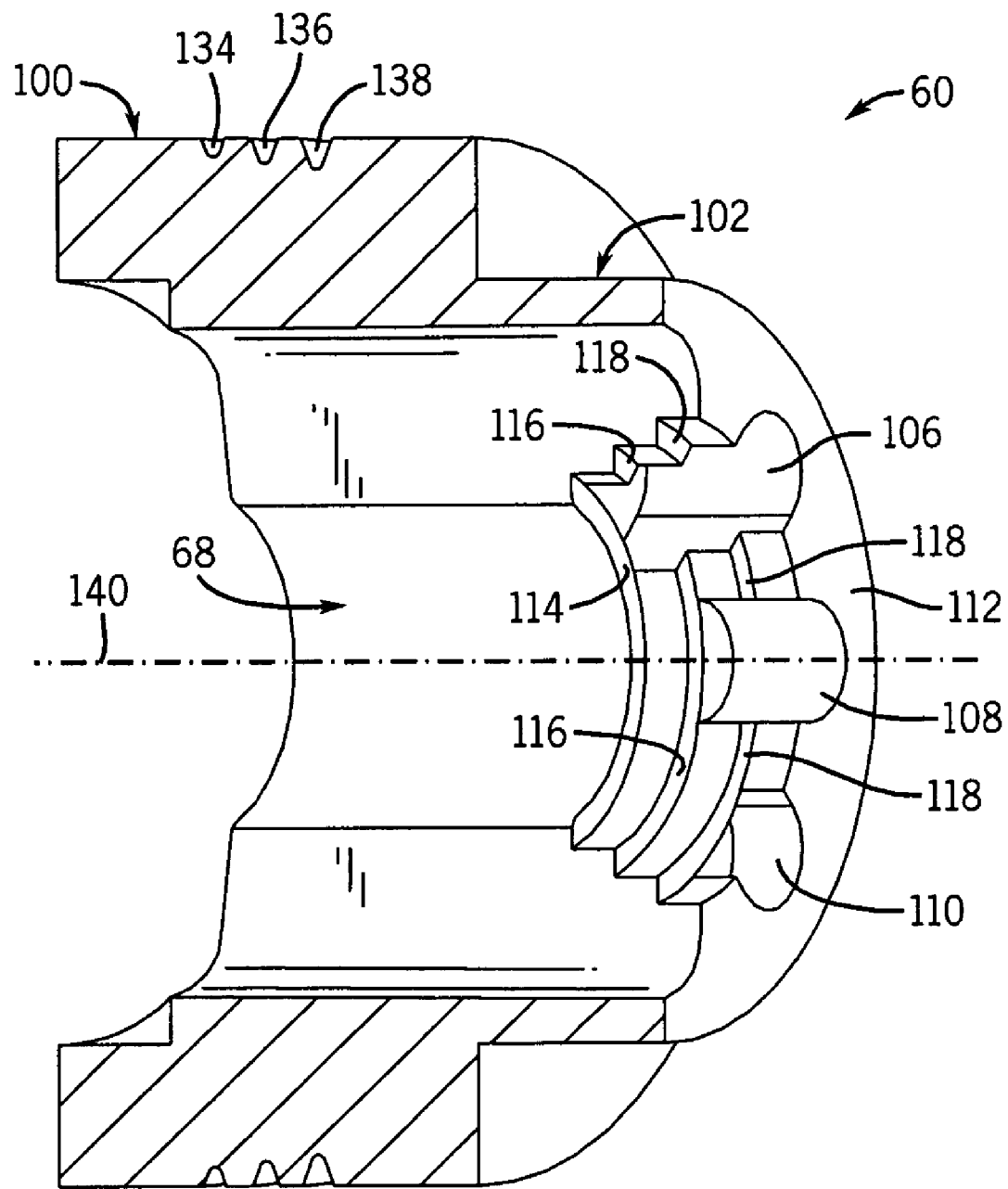
FIG. 5 is a sectional view of the drive roll illustrated in FIGS. 3 and 4.

FIG. 6 is a detailed view of the drive roll illustrated in FIGS. 3-5 installed in an exemplary drive assembly and set to align one circumferential groove with a wire path in the drive assembly in accordance with one embodiment of the present invention; and FIG. 7 is a detailed view of the drive roll and assembly illustrated in FIG. 6, depicting adjustment of the drive roll between various settings to alternatively align circumferential grooves with the wire path in accordance with one embodiment of the present invention.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
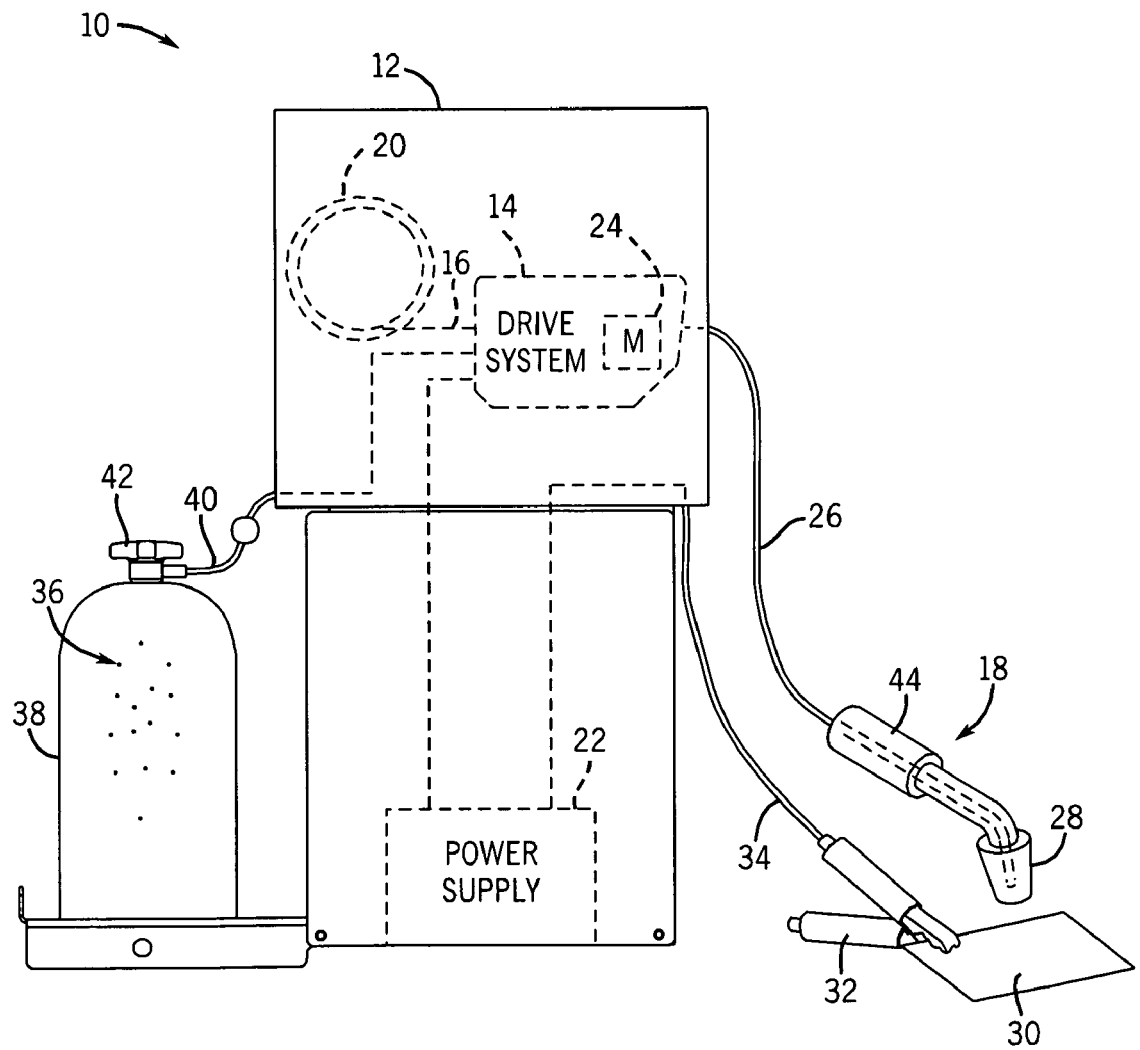
FIG. 1 is a diagrammatic representation of a welding system, in accordance with one embodiment of the present invention.

FIG. 1 illustrates an exemplary wire-feed welding system 10 that includes an adjustable drive roll in accordance with certain embodiments of the present technique. Prior to continuing, however, it should be noted that the following discussion merely relates to exemplary embodiments of the present technique. As such, the appended claims should not be viewed as limited to those embodiments specifically described herein.

The exemplary welding system 10 includes a plurality of components disposed within a housing 12, including a drive system 14. In operation, the drive system 14 advances a wire electrode 16 from the housing 12 to a welding torch or gun 18. This wire electrode 16 may be fed from a wire spool 20 disposed within the housing 12. Particularly, in the presently illustrated embodiment, a power supply 22 provides operating power to a motor 24 of the drive system 14 to facilitate advancement of the wire electrode 16. As will be appreciated, the wire electrode 16 may be advanced through a supply cable 26 to a contact tip within the nozzle 28 of the welding torch 18.

During a welding operation, placement of the nozzle 28 at a location proximate to a workpiece 30 allows electrical current provided by the power supply 22, which is routed to the welding torch 18 via the supply cable 26, to arc from the welding torch 18 to the workpiece 30. In short, this arcing completes an electrical circuit that includes the power supply 22, the welding torch 18, the workpiece 30, a ground clamp 32, and a ground cable 34. Particularly, in one embodiment, current passes from the power supply 22, to the welding torch 18 via the supply cable 26, to a portion of the wire electrode 16 within the welding torch 18, and then arcs to the workpiece 30. This arcing generates a relatively large amount of heat that causes the workpiece 30 and/or a filler metal to transition to a molten state, thereby facilitating the weld. As will be appreciated, such filler metal may be provided by the wire electrode 16 or from some other source.

It bears noting that a wide array of wire electrodes 16 may be used in the exemplary system 10 in full accordance with the present techniques. For instance, the wire electrode 16 may comprise any of a variety of suitable metals, such as aluminum, stainless steel, nickel, or iron, for instance. Additionally, in some embodiments, the wire electrode 16 may be a solid wire or a cored wire, including a flux cored or gasless wire electrode. As will be further appreciated, various welding electrodes 16 may also have different widths or diameters than one another, such as diameters of 0.024 inches, 0.030 inches, and 0.035 inches, to name but a few. Indeed, as discussed in greater detail below, the drive system 14 may be configured to advance a variety of wire electrodes 16 that may differ in size and/or composition.

To shield the weld area from contaminants during welding, to enhance arc performance, and to improve the resulting weld, a shielding material 36 may be provided from a cylinder 38 to the welding torch 18 via the supply cable 26. In one embodiment, the shielding material 36 is an inert gas. It should be noted, however, that a wide variety of shielding materials may be utilized in addition to, or in place of, an inert gas, including active gases, various other fluids, and particulate solids. It will also be appreciated that other embodiments, such as those employing gasless wire electrodes, may not greatly benefit from a shielding material 36 and, accordingly, may or may not include the cylinder 38. The shielding material 36 may enter an outlet hose 40 through a regulator 42 of the cylinder 38 and ultimately pass to a neck portion 44 of the welding torch 18 via the supply cable 26.

Figure 2:
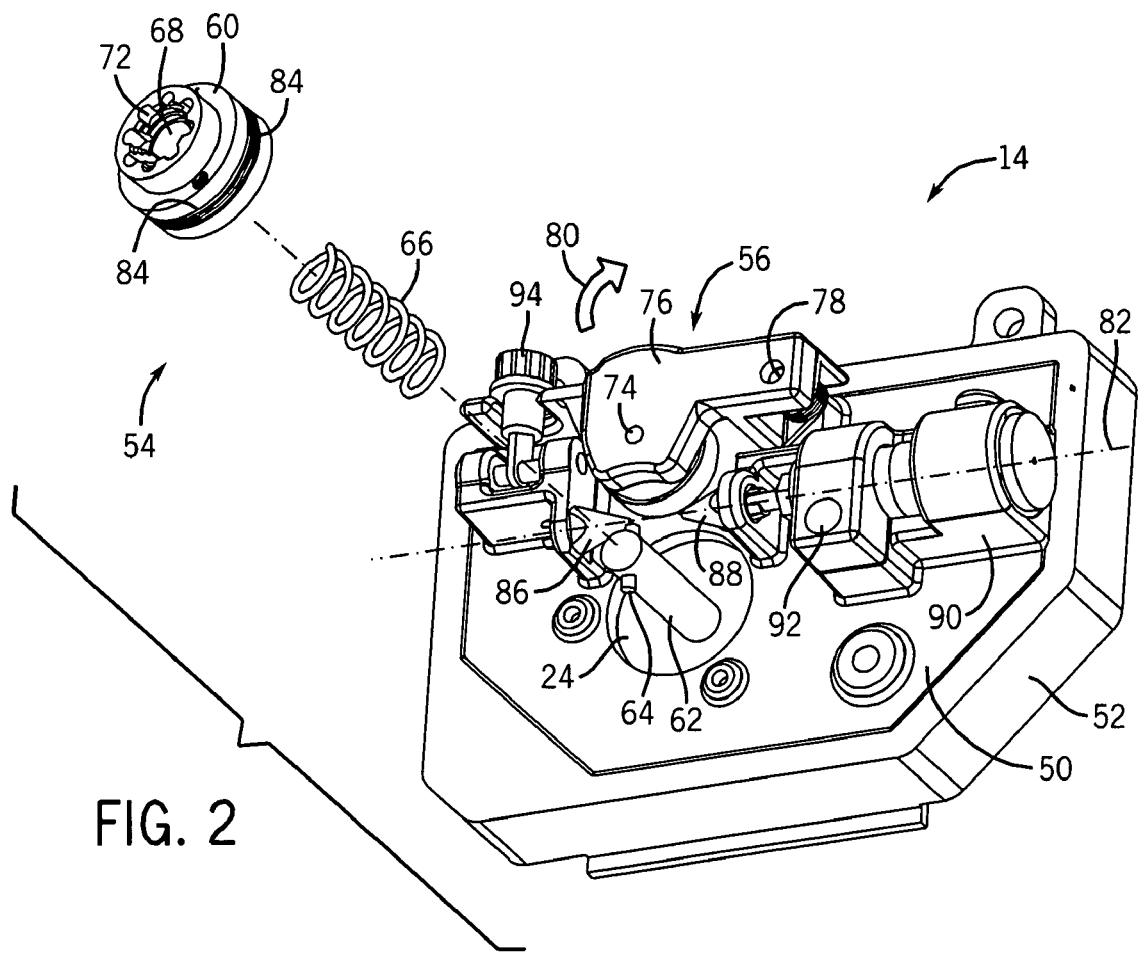
FIG. 2 is an exploded view of the exemplary drive system of FIG. 1, in accordance with one embodiment of the present invention.

An exemplary drive assembly 50 of the drive system 14 is illustrated in FIG. 2. The drive assembly 50 includes a mounting or support structure 52 that receives first and second drive roll assemblies 54 and 56, respectively. In the presently illustrated embodiment, the drive roll assemblies 54 and 56 are generally disposed opposite one another, each assembly including a drive roll 60. The drive roll assemblies 54 and 56 cooperate to advance the wire electrode 16 to the welding torch 18, as discussed above.

The exemplary first drive roll assembly 54 may be mounted on a shaft 62 of the motor 24, which includes one or more locking members or tabs 64 configured to apply torque to the first drive roll assembly 54 during operation of the motor 24. A biasing spring 66 may be provided to bias the first drive roll assembly 54 into engagement with the tabs 64 of the shaft 62. To facilitate installation, the drive roll 60 of the first drive roll assembly 54 includes a slot 68 for receiving the shaft 62 and the tabs 64.

The drive roll 60 of the first drive roll assembly 54 includes a plurality of mounting or alignment recesses 72 for receiving the tabs 64 of the shaft 62. Particularly, when installed on the shaft 62, the biasing spring 66 applies a biasing force to the first drive roll assembly 54, facilitating engagement of the tabs 64 within one or more of the recesses 72. Once the tabs 64 are disposed in such recesses, rotation of the shaft 62 transmits a torque to the drive roll 60 of the first drive roll assembly 54 via the tabs 64. This torque may then be transmitted to the second drive roll assembly 56, such as through a frictional force, causing rotation of the second drive roll assembly 56 about a pivot or rotational axis 74.

In one embodiment, the second drive roll assembly 56 is secured to a tension arm 76 that may rotate about a pivot 78, as generally indicated by arrow 80, to allow the second drive roll assembly 56 to be positioned closer to or further from the first drive roll assembly 54. Particularly, the drive system 14 may include a wire path 82 that generally defines the route of a wire electrode 16 through the drive system 14. In particular, in the present embodiment, the wire path 82 passes from an inlet guide 86 to an outlet guide 88 between the first and second drive roll assemblies 54 and 56. Various grooves 84 may be disposed on one or both of the drive rolls 60 to advance a wire electrode 16 between the inlet and outlet guides 86 and 88.

The drive assembly 50 may also include a coupling 90 that facilitates connection of the welding torch 18 to the drive system 14, such as via the supply cable 26. In one embodiment, the coupling 90 includes a shielding material inlet port 92 for receiving a shielding material, such as the shielding material 36, and transmitting the shielding material to the welding torch 18. An adjustment knob 94 may also be incorporated into the drive assembly 50 to facilitate adjustments to the amount of force applied to a wire electrode 16 by the second drive roll assembly 56 and the tension arm 76.

An exemplary drive roll 60 is illustrated in FIGS. 3-5. In one embodiment, the respective drive rolls 60 of the first and second drive roll assemblies 54 and 56 may be substantially identical. However, in other embodiments, the drive roll 60 of each assembly may be different than one another, such as differing in size, configuration, or composition. For instance, in one embodiment, one of the drive rolls 60 may include a plurality of grooves 84, while the other drive roll does not include such grooves. Indeed, in one embodiment, one of the drive rolls 60 may be essentially composed of a bearing that may or may not have grooves 84 or mounting recesses 72. The drive rolls 60 may be formed from various suitable materials and manufacturing techniques, such as cast aluminum or machined steel, for instance.

In the presently illustrated embodiment, the exemplary drive roll 60 may include a wire routing portion 100 that generally composes a first end of the drive roll 60, and a mounting portion 102 that generally composes a second end of the drive roll 60. The exemplary wire routing portion 100 includes a generally circumferential surface 104 having a plurality of grooves formed therein. As discussed in greater detail below, each of the grooves 84 may be configured to receive and advance a wire electrode 16 that is different in size and/or composition than the wire electrodes the other grooves are configured to receive.

The mounting portion 102 includes a plurality of mounting recesses 106, 108, and 110, which are formed in a surface 112 of the drive roll 60. Once assembled, the tabs 64 of the motor shaft 62 may be disposed within the mounting recesses 106, 108, or 110, each tab 64 abutting a mounting shoulder 114, 116, or 118, respectively. In the presently illustrated embodiment, the mounting recesses 106, 108, and 110 are each composed of a related pair of mounting recesses that are disposed about an inner circumference of the drive roll 60 opposite one another. Each recess of the related pair has a depth, measured from the surface 112 to its respective mounting shoulder 114, 116, or 118, that is substantially equivalent to the depth of the other recess of the pair.

In other words, each of the mounting recesses 106 has a depth from the surface 112 to their respective mounting shoulders 114 of similar magnitude. Likewise, in the present embodiment, each of the mounting recesses 108 has a common depth from the surface 112 to a respective mounting shoulder 116, and each of the mounting recesses 110 has a common depth from the surface 112 to a respective mounting shoulder 118. It should be noted, however, that other embodiments and configurations are also envisaged, such as one or more embodiments in which the drive roll 60 includes only single mounting recesses 106, 108, and 110, or sets of mounting recesses each having a number of related mounting recesses greater than two.

In certain embodiments, each set of mounting recesses 106, 108, and 110, corresponds to a respective groove configured to receive a wire electrode of a specific size or diameter. For instance, in one embodiment, three grooves 84 associated with the mounting recesses may be disposed about the drive roll 60 and configured to receive wire electrodes having diameters of or near 0.024 inches, 0.030 inches, and 0.035 inches, respectively. Accordingly, indicators 120, 124, and 126 may be disposed adjacent their respective mounting recesses to facilitate alignment of a particular groove 84 with the wire path 82 (FIG. 2). Additionally, in one embodiment, the exemplary drive roll 60 includes a recessed portion 128 to facilitate engagement with other possible components of the drive roll assemblies 54 or 56 (FIG. 2).

In one embodiment, the grooves 84 include individual grooves, 134, 136, and 138. In the present embodiment, grooves 134, 136, and 138, are generally V-shaped. In other embodiments, however, one or more of the grooves 134, 136, and 138 may have a different profile, such as generally U-shaped, to better accommodate advancement of a wire electrode having different strength or ductility. Further, while the presently illustrated embodiment provides three grooves 84, other embodiments having a greater or fewer number of grooves are also envisaged.

In this exemplary embodiment, the axial distance (generally taken along the axis 140) between the groove 134 and the mounting shoulder 114 is substantially identical to the axial distance between the groove 136 and the mounting shoulder 116 as well as that between the groove 138 and the mounting shoulder 118. As will be appreciated, the spring 66 (FIG. 2) applies a biasing force that causes one of the mounting shoulders 114, 116, or 118 to engage a mounting tab 64 disposed within the respective mounting recess. The equidistant arrangement of the grooves 134, 136, and 138, with respect to their corresponding mounting shoulders 114, 116 and 118, enables alignment of a particular groove with the wire path 82 (FIG. 2) by disposing a tab 64 of the motor shaft 62 within a particular mounting recess 106, 108, or 110. Particularly, when the tabs 64 are disposed within the mounting recesses 106, the biasing force applied by the spring 66 causes the tabs 64 to abut mounting shoulders 114, which brings the groove 134 into alignment with the wire path 82 (FIG. 2), as generally illustrated in FIG. 6.

As noted by the indicator 120, the groove 134 of the presently illustrated embodiment may be configured to receive and advance a wire electrode having a diameter of approximately 0.024 inches. However, to accommodate a wire electrode of a different size or composition, the drive roll 60 may be depressed, as generally indicated by the arrow 144 in FIG. 7, and rotated either clockwise or counterclockwise, as generally indicated by the arrow 146, to align one of the other grooves, such as the groove 136 or the groove 138, with the wire path 82. When the tabs 64 are aligned with the desired mounting recesses, the drive roll 60 may be released such that the spring 66 biases the respective mounting shoulders toward the tabs 64.

As may be appreciated, when the tabs 64 are disposed within the mounting recesses 108 and in contact with the mounting shoulders 116, the drive roll 60 is at a different axial position with respect to the shaft 62 than is the case if the tabs 64 were disposed in the mounting recesses 106. This axial displacement, in consort with the equidistant nature of respective sets of grooves and mounting recesses, results in alignment of groove 136 with the wire path 82 when the tabs 64 are disposed within the mounting recesses 108. Similarly, disposal of the tabs 64 within the mounting recesses 110 result in the alignment of groove 138 with the wire path 82. Consequently, in this embodiment, the drive roll may be adjusted to advance a variety of wire electrodes 16 along the wire path 82 without the need for removing the drive roll 60 from the shaft 62, thus facilitating quicker and easier adjustment of the drive roll and interchanging of different wire electrodes 16 for use in the welding system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a housing; and
   a drive mechanism disposed within the housing and configured to advance a wire electrode substantially along a wire path into a welding torch, the drive mechanism comprising:
   a shaft driven by a motor; and
   a first drive roll coupled to the shaft and configured to rotate about an axis therewith, the first drive roll including a first portion, the first portion having a plurality of grooves configured to receive and advance the wire electrode, and a second portion opposite the first portion, the second portion having a plurality of recesses configured to selectively receive a locking member that extends radially from the shaft and is configured to transmit torque from the shaft to the drive roll during operation of the motor;
   wherein each of the plurality of grooves is associated with at least one recess of the plurality of recesses such that selective receipt of the locking member in a particular recess enables a groove associated with the particular recess to be substantially aligned with the wire path and to advance the wire electrode, and an axial distance along the axis between each groove and the at least one recess associated with the respective groove is substantially equal for each associated pair of grooves and recesses.

2. The welding system of claim 1, wherein each groove is associated with a subset of the plurality of recesses, the subset comprising multiple recesses having a substantially common depth measured from the surface of the drive roll in which the multiple recesses are formed to respective mounting shoulders of the multiple recesses.

3. The welding system of claim 2, wherein the shaft comprises a plurality of locking members and the each subset of the plurality of recesses is configured to receive the plurality of locking members.

4. The welding system of claim 1, wherein each groove of the plurality of grooves is configured to receive a different type of wire.

5. The welding system of claim 4, wherein at least two grooves of the plurality of grooves are configured to receive wire electrodes of different diameters.

6. The welding system of claim 1, comprising a second drive roll.

7. The welding system of claim 6, wherein the second drive roll comprises an additional plurality of grooves configured to receive and advance the wire electrode.

8. The welding system of claim 7, wherein the first and second drive rolls are configured to be positioned opposite one another with respect to the wire path.

9. A drive mechanism comprising:
a motor;
a shaft coupled to the motor;
a first drive assembly comprising a drive roll including a wire feed portion and a mounting portion opposite one another, the wire feed portion including a plurality of circumferential grooves configured to receive and advance one of various wires along a single wire path during rotation of the drive roll about an axis, and the mounting portion including a plurality of alignment recesses formed in a common surface of the drive roll, wherein each alignment recess facilitates alignment of a respective circumferential groove with the single wire path; and
a second drive assembly, wherein at least one of the first or second drive assemblies is coupled to the shaft for rotation therewith during operation of the motor;
wherein the drive mechanism enables a user to alternatively align each of the circumferential grooves with the single wire path without removing the drive roll from the drive mechanism.

10. The drive mechanism of claim 9, comprising inlet and outlet guides, wherein each of the alignment recesses facilitates alignment of its respective circumferential groove with the inlet and outlet guides.

11. The drive mechanism of claim 9, wherein the drive mechanism is configured to enable a user to alternatively align each of the circumferential grooves with the single wire path by applying an axial force to the drive roll, rotating the drive roll about its axis, and then releasing the axial force to select one of the circumferential grooves.

12. The drive mechanism of claim 9, wherein the second drive assembly comprises an additional drive roll that is substantially identical to the drive roll of the first drive assembly.

13. The drive mechanism of claim 9, wherein the wire feed and mounting portions are disposed axially opposite one another.

14. A drive roll configured to rotate about an axis, the drive roll comprising:
a main body having a central aperture along the axis;
a feed portion including an outer circumferential surface of the drive roll and a plurality of grooves formed in the outer circumferential surface, wherein each groove is configured to receive and advance a respective wire; and
a mounting portion including a plurality of mounting features, the plurality of mounting features including at least one mounting feature corresponding to each respective groove of the plurality of grooves, wherein each mounting feature is uniquely associated with only one groove of the plurality of grooves;
wherein the central aperture facilitates mounting of the main body on a shaft of a drive mechanism, and the plurality of mounting features facilitates receipt of a mating feature of the drive mechanism and cooperates with the mating feature to enable a user to alternatively align each of the plurality of grooves along a single wire path without removing the main body from the shaft.

15. The drive roll of claim 14, wherein the mounting portion and the feed portion are axially displaced with respect to one another and the respective axial distances between each mounting feature and its associated groove are substantially equal to one another.

16. The drive roll of claim 14, wherein the plurality of mounting features comprise a plurality of mounting surfaces defined by a plurality of recesses formed in an axial surface of the drive roll.

17. The drive roll of claim 14, wherein each groove is configured to receive a differently-sized wire.

18. The drive roll of claim 14, wherein at least two of the grooves are configured differently from one another to receive respective wires having different compositions.

19. The drive roll of claim 14, wherein at least one of the grooves has a V-shaped profile.

* * * * *